March 25, 1958    A. G. LAUTZENHISER    2,828,139
FLUID SUSPENSION CONTROL SYSTEM
Filed June 18, 1956
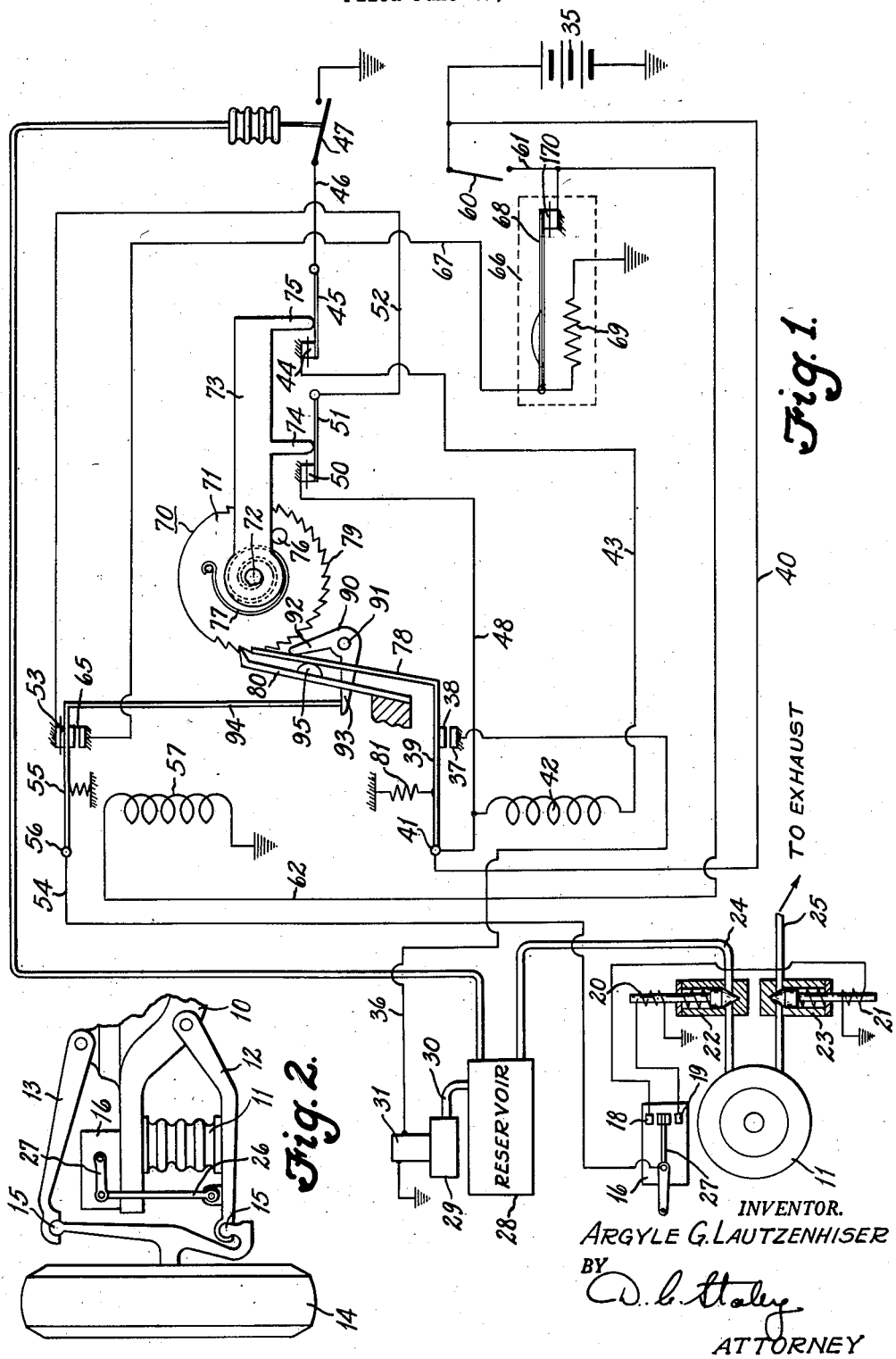
INVENTOR.
ARGYLE G. LAUTZENHISER
BY
ATTORNEY

United States Patent Office 2,828,139
Patented Mar. 25, 1958

2,828,139

FLUID SUSPENSION CONTROL SYSTEM

Argyle G. Lautzenhiser, Anderson, Ind., assignor to General Motors Corporation, Detroit, Mich., a corporation of Delaware Application June 18, 1956, Serial No. 592,014

7 Claims. (Cl. 280—124)

This invention relates to a fluid suspension system for a motor vehicle of the type wherein an expansible fluid spring supports the chassis or sprung mass upon the running gear or unsprung mass.

In fluid suspension systems an expansible bellows adapted to receive fluid, preferably air, under pressure is placed between the sprung mass and the unsprung mass for resilient support of the sprung mass. Suitable controls are provided to admit air under pressure into the bellows or exhaust air from the bellows in response to a change in load on the sprung mass. Changes in load on the sprung mass cause the chassis to move downwardly relative to the running gear or unsprung mass when the load increases and to rise relative to the unsprung mass when the load decreases. Thus air under pressure is admitted into the bellows spring when the load increases to compensate for the increased load and maintain a predetermined clearance height relationship between the chassis and the running gear of the vehicle. Conversely, when the load on the chassis is decreased, air is exhausted from the bellows spring to again provide for correction of clearance height to allow the chassis to settle downwardly relative to the running gear and reestablish the predetermined height relationship between the chassis and the running gear of the vehicle.

In some fluid suspension systems mechanically operated valving is provided in the air pressure inlet and exhaust lines for the expansible bellows, the valve being actuated by a change in the clearance height relationship between the chassis and the running gear of the vehicle. In other systems, electrically operated valves are provided in the air pressure inlet and exhaust lines for the fluid expansible bellows spring, the electrically operated valves being actuated upon the closing of electric switches that respond to changes in clearance height relation between the sprung mass and the unsprung mass of the vehicle. The switches are adapted to open the electrically operated inlet valve in response to a decrease in clearance height relationship and to open the exhaust valve in response to an increase in clearance height relationship.

In fluid suspension systems there is provided a source of fluid under pressure, preferably a reservoir containing air under pressure, that provides a continuous supply of fluid, or air, available for use in supplying the fluid springs for the vehicle. An air compressor is provided for maintaining the body of fluid in the reservoir at a relatively constant pressure level, the compressor being adapted to be driven by an electric motor that receives its electric current for operation from the battery of the vehicle.

In air suspension systems of the general type just referred to, there is a certain amount of leakage of air from the system which will result in a decrease of air pressure in the fluid springs so that when the vehicle stands idle for a prolonged period of time the chassis will tend to settle downwardly relative to the running gear. This results in an abnormal overall height of the vehicle, and if allowed to persist would give the vehicle the appearance of resting on the wheels, which appearance is undesirable.

To prevent such a situation from existing, the air compressor that supplies the air under pressure to the reservoir is operated by a pressure responsive switch so that whenever the air pressure reservoir fails to a predetermined low level, the compressor will operate to restore the air pressure in the reservoir to its predetermined maximum level. With a constant air pressure source available for use by the height correction control, the vehicle will not at any time be allowed to settle and assume an undesirable appearance because of a low position of the chassis relative to the running gear. However, whenever the compressor operates, the electric motor that drives the same will draw current from the vehicle battery with the final result that if a vehicle stands idle over a prolonged period the battery will be completely discharged. To avoid this situation it is therefore desirable that when a vehicle stands idle for a long period of time that the electric circuit for the electric motor of the compressor be deactivated after a certain number of operations of the compressor so that the battery of the vehicle will not be completely discharged.

It is therefore an object of this invention to provide a control in the electric circuit for the electrically driven compressor of the air supply system for an air suspension system that is normally rendered inactive so long as the ignition switch of the vehicle is closed, but which is rendered active when the ignition switch is open, the control being constructed and arranged to be actuated concurrently with each energization of the electric motor for the compressor so that after the electric motor for the compressor has been operated a predetermined number of times, the control will deactivate the electric circuit for the electric motor and thereby prevent further operation of the compressor at least until the ignition switch is again closed, which closing of the ignition switch will reset the control to its initial position of operation.

Further objects and advantages of the present invention will be apparent from the following description, reference being had to the accompanying drawings wherein a preferred form of the invention is clearly shown.

In the drawings:

Figure 1 is a schematic diagram of a control system for a fluid suspension system incorporating features of this invention.

Figure 2 is a diagrammatic view of a fluid suspension system for a motor vehicle.

In Figure 2 the vehicle consists of a chassis or frame 10 that is a sprung mass supported by an expansible fluid spring 11 that is carried between the frame 10 and the lower control arm 12 of a front end of a suspension of a vehicle that includes the upper control arm 13, the control arms 12 and 13 supporting a wheel 14 through the spherical joints 15. The fluid spring 11 preferably consists of an expansible bellows that contains a fluid under pressure sufficient to support the sprung mass, or chassis 10 upon the unsprung mass or wheel assembly. The fluid or air spring 11 establishes a predetermined height relationship between the sprung mass 10 and the wheel assembly, or unsprung mass.

When the load on the sprung mass 10 increases, the height relationship between the sprung mass and the unsprung mass is reduced. This change in height relationship can be offset by supplying air under pressure to the air spring 11 to balance the increased load and effect a height correction between the sprung mass and the unsprung mass to return the masses to the predetermined relative height relationship. Similarly, when the load decreases in the vehicle, the sprung mass 10 tends to rise relative to the unsprung mass or wheel assembly so that air can be exhausted from the spring 11 at this time to allow the chassis to settle downwardly and reestablish the predetermined height relationship.

Supply of air to the air spring 11 or exhaust of air from the spring is occasioned under control of a wheel switch 16, see Fig. 1, which has the contacts 18 and 19 connected with the electric solenoids 20 and 21 respectively of the solenoid operated valves 22 and 23. Valve 22 is placed in the pressure inlet line 24 supplying fluid under pressure to the air spring 11. The valve 23 is placed in the exhaust line 25 to exhaust air from the air spring 11.

The electric switch 16 is connected with the lower control arm 12 by means of a link 26 so that the switch arm 27 is responsive to a change in height relationship between the sprung mass and the unsprung mass of the vehicle.

Air under pressure that is conducted through the inlet line 24 is received from a body of air under pressure maintained in the reservoir 28, an air compressor 29 being connected with the reservoir through the conduit 30 and adapted to be operated by the electric motor 31 that receives its current for operation from the battery of the vehicle as illustrated in the electric circuit hereinafter described.

The electric motor 31 of the compressor 29 is connected with the battery 35 of the vehicle through the line 36, the contacts 37 and 38, the arm 39 and the wire 40. The arm 39 is pivoted on the pivot member 41. The arm 39 is actuated by the relay coil 42 which when electrically energized closes contact 38 on contact 37 to effect energization of the electric motor 31 and thereby causes operation of the compressor 29 to supply air under pressure to the reservoir 28.

The relay coil 42 is connected with the battery 35 through the line 40 and thence through the line 43, contacts 44, arm 45 and line 46 with a pressure actuated switch 47. The pressure switch 47 is responsive to the pressure in the reservoir 28 and will close when the reservoir pressure reaches a predetermined low value. When the pressure is restored in the reservoir the switch 47 will open and stop the compressor 29. An electric switch 16 is provided adjacent each wheel of the vehicle and therefore responds to the position of the chassis relative to the running gear at the respective wheel. The electric switch 16 receives actuating current from the battery 35 through the electric line 40, the line 48, contacts 50, arm 51, line 52, contacts 53 and line 54 whereby the switches 16 are electrically active so that when a switch arm 27 moves into engagement with either contact 18 or 19 one or the other of the solenoids 20 or 21 will be energized to effect opening of the respective valve for admission of air to the air spring 11 or exhaust of air from the same to provide for clearance height correction as called for by the respective switches 16. The contacts 53 are carried on the arm 55 pivoted about the pivot point 56, the arm 55 being actuated by an electric solenoid relay coil 57. The electric coil 57 is in series with the ignition switch 60 of the vehicle through the lines 61 and 62. Thus whenever the ignition switch 60 is closed, the relay coil 57 will be energized to close the contacts 65 so that the wheel switches 16 will receive electric current for their energization from the battery 35 through the line 61, the timing interrupter 66, the electric line 67, contacts 65 and line 54, this being the normal electric circuit for effecting energization of the wheel switches 16 whenever the ignition switch is closed for operation of the engine of the vehicle.

Thus when the engine of the vehicle is operating, contacts 53 will be open to break circuit through the electric lines connected therewith but with a controlled electric circuit being made through the interrupter 66 and the contacts 65. The circuit interrupter 66 consists of a bimetallic member 68 that is heated by a heating element 69. When the contacts 170 of the interrupter are closed, the heating element 69 will be heated so that after a predetermined period of time the bimetal blade 68 will open the contacts 170 and break circuit to the wheel switches 16. This arrangement provides for actuation of the wheel switches 16 only during a predetermined period of time, rather than for continuous operation, it being established that it is desirable to provide for height correction intermittently to compensate for air leakage whereby the chassis will tend to settle downwardly relative to the running gear when the vehicle stands idle and is not operating for a time period during which the compressor can be operated by an electric driving motor for a predetermined number of cycles and then cutout to prevent run down of the battery by continued compressor operation and height correction, for example.

In the electric circuit thus far described, when the ignition switch 60 is closed the relay 57 will be energized to close contacts 65 and thereby provide for electric current to the wheel switches 16 so that height correction can be made by the control valves 22 and 23 as required during the controlled period of time allowed for such correction by the circuit interrupter 66. During this operation, if the pressure in the reservoir 28 falls to a predetermined low level, the motor 31 of the compressor will be actuated by closing of the pressure switch 47 through the circuit heretofore described.

The arrangement just described will maintain a predetermined height relation between the sprung mass and the unsprung mass of the vehicle for any period of time. However, when the ignition switch 60 is open, the drain of the compressor motor 31 on the battery will gradually discharge it. Hence it is desirable that when the ignition switch 60 is open, the compressor motor will be operated only for a predetermined number of times determined to be insufficient to discharge a normally charged battery, whereafter the compressor motor should be deactivated to prevent further operation and thus further discharge of the battery. At this same time the wheel switches 16 should also be deactivated.

To provide for the aforementioned operation, a control 70 is provided. This control includes a ratchet wheel 71 rotating on a pivot axis 72. A contact arm 73 is also carried on the pivot axis 72 and has the projections 74 and 75 that engage the contact blades 51 and 45 to open the contacts 50 and 44 respectively when the contact arm moves downwardly, that is clockwise.

The ratchet wheel 71 carries a pin 76 that is normally held in engagement with the lower side of the contact arm by a torsion spring 77 that tends to rotate the ratchet wheel in a counter-clockwise direction, thus holding the pin 76 against the lower side of the arm 73.

The relay arm 39 carries a pawl 78 adapted to engage the ratchet teeth 79 on the wheel 71. A second pawl 80 also engages the ratchet teeth 79 to prevent counterclockwise movement of the wheel 71 when the pawl 78 tends to move the wheel in a clockwise direction.

The pawl 78 is operated each time the relay coil 42 is energized as a result of closing of the pressure switch 47. Thus the relay coil 42 not only effects closure of electric circuit to the compressor motor 31 but also actuates the pawl 78 so that the upper end of the pawl will engage the next successive ratchet tooth counter-clockwise from its previous position. When the reservoir 28 has reached the desired pressure, pressure switch 47 will be opened to deenergize relay coil 42 and allow spring 81 to move the pawl 78 upwardly and thus rotate the ratchet wheel by one ratchet tooth.

It will thus be seen that, depending on the ratchet teeth 79 provided on the wheel 71, the number of times the compressor motor 31 will be energized will be counted until finally the pin 76 engages the upper side of the contact arm 73 to move it downwardly and open both sets of contacts 50 and 44. When both contacts 50 and 44 are open, the electric circuit to the compressor motor is deactivated, as is the circuit to the wheel switches 16.

From the foregoing description it will thus be apparent that when the ignition switch 60 is open, the energizing circuits for the compressor motor 31 and the wheel switch 16 can be maintained only until the compressor motor has been energized a predetermined number of times in response to opening and closing of the pressure switch 47, whereafter the energizing circuits to the compressor motor 31 and the wheel switches 16 are deactivated to prevent further drain on the battery of the vehicle.

Assuming the compressor to have been operated a number of times after the ignition switch 60 has been opened, the pin 76 will have been moved clockwise to a position intermediate its extreme positions in engagement with the bottom and top of the arm 73 respectively, or to its extreme upper position with the result that a mechanism is necessary to provide for resetting of the ratchet wheel 71 with the pin 76 in engagement with the lower side of the arm 73. This resetting mechanism consists of a bell crank lever 90 pivoted on a pin 91 so that the arm 92 engages the pawl 78 and the arm 93 is engaged by an arm 94 that extends from the relay contact arm 55. Thus when relay coil 57 is energized by closing of the ignition switch 60 to move arm 55 downwardly and close contact 65, the bell crank lever 90 will be rotated in a counter-clockwise direction to cause the pawl 78 to release from the ratchet teeth 79 and concurrently to cause the pawl 80 to be released from the ratchet teeth 79 since the pawl 78 engages the boss 95 on the pawl 80 to carry both pawls out of engagement with the ratchet wheel 71 concurrently, as a result the torsion spring 77 will cause the pin 76 to rotate in a counter-clockwise direction to re-engage the bottom surface of the arm 73 to move the arm 73 in a counter-clockwise direction and allow contacts 44 and 50 to be reclosed. This reestablishes the energizing circuits for the wheel switches 16 and the compressor motor 31 at the time the ignition switch 60 is closed.

While the form of embodiment of the invention as herein disclosed constitutes a preferred form, it is to be understood that other forms might be adopted as may come within the scope of the claims which follow.

What is claimed is as follows.

1. In an air suspension system for a motor vehicle, the combination comprising, expansible fluid spring means resiliently supporting the sprung mass of a vehicle relative to the unsprung mass thereof, control means actuated by a change in relative height position between the sprung mass and the unsprung mass to supply fluid under pressure to said spring to effect height correction between the sprung mass and the unsprung mass and restore the masses to a predetermined relative height relation, a fluid pressure development source operated intermittently to establish and maintain a fluid body under pressure for supply to said spring, and control means having one position effective normaly to permit said fluid pressure development source to be rendered active to supply said body with fluid under pressure and a second position effective on a predetermined series of intermittent operations of said source to render said source inactive.

2. In an air suspension system for a motor vehicle, the combination comprising, expansible fluid spring means resiliently supporting the sprung mass of a vehicle relative to the unsprung mass thereof, control means actuated by a change in relative height position between the sprung mass and the unsprung mass to supply fluid under pressure to said spring to effect height correction between the sprung mass and the unsprung mass and restore the masses to a predetermined relative height relation, a fluid pressure development source operated intermittently to establish and maintain a fluid body under pressure for supply to said spring, and control means actuated intermittently with said source and having one position effective normally to permit operation of said source and a second position effective upon a predetermined series of intermittent operations of said source to prevent operation of said source.

3. In an air suspension system for a motor vehicle, the combination comprising, expansible fluid spring means resiliently supporting the sprung mass of a vehicle relative to the unsprung mass thereof, control means actuated by a change in relative height position between the sprung mass and the unsprung mass to supply fluid under pressure to said spring to effect height correction between the sprung mass and the unsprung mass and restore the masses to a predetermined relative height relation, a fluid pressure development source operated intermittently to establish and maintain a fluid body under pressure for supply to said spring, and a counting mechanism effective to count the operations of said development source and having one position effective normally to permit operation of said source and a second position effective after a predetermined number of operations of said source to thereafter prevent operation of the source.

4. In an air suspension system for a motor vehicle, the combination comprising, expansible fluid spring means resiliently supporting the sprung mass of a vehicle relative to the unsprung mass thereof, control means actuated by a change in relative height position between the sprung mass and the unsprung mass to supply fluid under pressure to said spring to effect height correction between the sprung mass and the unsprung mass and restore the masses to a predetermined relative height relation, an electrically operated pump actuated intermittently to establish and maintain fluid under pressure for supply to said spring, an electric circuit including a battery for supplying electric current to said pump for operation of the same, and a control means in said electric circuit actuated concurrently with each operation of said pump and having one position effective normally to permit electric current flow to said pump for actuation thereof and a second position effective upon a predetermined number of operations of said pump to break electric circuit to said pump and thereby prevent operation of the pump.

5. In an air suspension system for a motor vehicle, the combination comprising, expansible fluid spring means resiliently supporting the sprung mass of a vehicle relative to the unsprung mass thereof, control means actuated by a change in relative height position between the sprung mass and the unsprung mass to supply fluid under pressure to said spring to effect height correction between the sprung mass and the unsprung mass and restore the masses to a predetermined relative height relation, an electrically operated pump actuated intermittently to establish and maintain fluid under pressure for supply to said spring, an electric circuit including a battery for supplying electric current to said pump for operation of the same, and a control means in said electric circuit actuated concurrently with each operation of said pump and having one position effective normally to permit electric current flow to said pump for actuation thereof and a second position effective upon a predetermined number of operations of said pump to break electric circuit to said pump and thereby prevent operation of the pump, a master switch for controlling energization and deenergization of said electric circuit, and electrically operated means rendered effective upon closing of said master switch to render said last mentioned control means ineffective so long as said master switch is set to provide for energization of said electric circuit.

6. In an air suspension system for a motor vehicle, the combination comprising, expansible fluid spring means resiliently supporting the sprung mass of a vehicle relative to the unsprung mass thereof, control means actuated by a change in relative height position between the sprung mass and the unsprung mass to supply fluid under pressure to said spring to effect height correction between the sprung mass and the unsprung mass and restore the masses to a predetermined relative height relation, an electrically operated pump actuated intermittently to establish and maintain fluid under pressure for supply to said spring, an electric circuit including a battery for supplying electric current to said pump for operation of the same, electrically operated control means in said electric circuit actuated concurrently with each operation of said pump and having one position effective normally to permit electric current flow to said pump for actuation thereof and a second position effective after a predetermined number of operations of said pump to break electric circuit to said pump and thereby prevent its operation, a master switch for said electric circuit, an electrically operated device rendered effective by closing of said master switch and operatively effective on said electrically operated control means to render the same inoperative so long as said master switch is closed for energization of the said electric circuit.

7. In an air suspension system for a motor vehicle, the combination comprising, expansible fluid spring means resiliently supporting the sprung mass of a vehicle relative to the unsprung mass thereof, control means actuated by a change in relative height position between the sprung mass and the unsprung mass to supply fluid under pressure to said spring to effect height correction between the sprung mass and the unsprung mass and restore the masses to a predetermined relative height relation, an electrically operated pump actuated intermittently to establish and maintain fluid under pressure for supply to said spring, an electric circuit including a battery for supplying electric current to said pump for operation of the same, and a control means in said electric circuit actuated concurrently with each operation of said pump and having one position effective normally to permit electric current flow to said pump for actuation thereof and a second position effective upon a predetermined number of operations of said pump to break electric circuit to said pump and thereby prevent operation of the pump, said control means including means effective to render said first mentioned control means ineffective when said second mentioned control means is in its second position.

References Cited in the file of this patent

UNITED STATES PATENTS

| | | |
|---|---|---|
| 1,464,680 | Lassen | Aug. 14, 1923 |
| 1,522,243 | Hughes | Jan. 6, 1925 |
| 1,555,199 | Gouirand | Sept. 29, 1925 |
| 2,115,072 | Hunt | Apr. 26, 1938 |
| 2,687,311 | Nallinger | Aug. 24, 1954 |